(12) United States Patent
Assenov

(10) Patent No.: US 8,987,541 B2
(45) Date of Patent: Mar. 24, 2015

(54) COAL WASTE TREATMENT PROCESSES AND PRODUCTS

(71) Applicant: Dimitre S. Assenov, Salt Lake City, UT (US)

(72) Inventor: Dimitre S. Assenov, Salt Lake City, UT (US)

( * ) Notice: Subject to any disclaimer, the term of this patent is extended or adjusted under 35 U.S.C. 154(b) by 0 days.

(21) Appl. No.: 14/262,652

(22) Filed: Apr. 25, 2014

(65) Prior Publication Data

US 2014/0251182 A1  Sep. 11, 2014

Related U.S. Application Data

(63) Continuation-in-part of application No. 13/646,365, filed on Oct. 5, 2012.

(60) Provisional application No. 61/816,160, filed on Apr. 26, 2013, provisional application No. 61/632,865, filed on Feb. 1, 2012.

(51) Int. Cl.

| *G21F 9/16* | (2006.01) |
| *C04B 18/02* | (2006.01) |
| *C04B 26/26* | (2006.01) |
| *C04B 28/02* | (2006.01) |
| *G21F 9/30* | (2006.01) |
| *G21F 9/34* | (2006.01) |
| *C04B 111/00* | (2006.01) |

(52) U.S. Cl.
CPC ............... *C04B 18/021* (2013.01); *G21F 9/162* (2013.01); *G21F 9/302* (2013.01); *G21F 9/34* (2013.01); *C04B 26/26* (2013.01); *C04B 28/02* (2013.01); *C04B 2111/0075* (2013.01)
USPC ............................ 588/14; 588/321; 588/404

(58) Field of Classification Search
USPC .......... 588/14, 10, 11, 12, 321, 404, 410, 412
See application file for complete search history.

(56) References Cited

U.S. PATENT DOCUMENTS

| 5,667,339 | A | 9/1997 | Dash |
| 6,258,994 | B1 | 7/2001 | Jantzen et al. |
| 6,342,650 | B1 | 1/2002 | Valfells |
| 6,734,334 | B2 | 5/2004 | Chekhmir et al. |

FOREIGN PATENT DOCUMENTS

| WO | 86/02770 | 5/1986 |
| WO | 2013/158196 A2 | 10/2013 |

OTHER PUBLICATIONS

United States Patent and Trademark Office, "International Search Report and Written Opinion," mailed Nov. 5, 2013, in related PCT application No. PCT/US2013/024232.

*Primary Examiner* — Edward Johnson
(74) *Attorney, Agent, or Firm* — Durham Jones & Pinegar, P.C. Intellectual Property Law Group

(57) ABSTRACT

Techniques for disposing of one or more toxic materials, such as coal waste (e.g., fly ash, sludge, etc.), include incorporating the toxic materials into artificial feldspar or forming artificial feldspar from the toxic material(s). The artificial feldspar may be used to form an artificial aggregate, which may be used in a construction material, as road base, as a fill material or for any other suitable purpose. Artificial aggregates that are formed from toxic materials are also disclosed, as are construction materials that include such artificial aggregates.

17 Claims, 1 Drawing Sheet

COAL WASTE TREATMENT PROCESSES AND PRODUCTS

CROSS-REFERENCE TO RELATED APPLICATIONS

A claim for the benefit of priority to the Apr. 26, 2013 filing date of U.S. Provisional Patent Application No. 61/816,160, titled COAL WASTE TREATMENT PROCESSES AND PRODUCTS, AND THEIR USES ("the '160 Provisional Application"), is hereby made pursuant to 35 U.S.C. §119(e). In addition, this application is a continuation-in-part of U.S. application Ser. No. 13/646,365, filed on Oct. 5, 2012 and titled NANO FLEX HLW/SPENT FUEL RODS RECYCLING AND PERMANENT DISPOSAL ("the '365 Application"), in which a claim to the benefit of the Feb. 1, 2012 filing date of U.S. Provisional Patent Application No. 61/632,865, titled NANO FLEX HLW/SPENT FUEL RODS RECYCLING AND PERMANENT DISPOSAL ("the '865 Provisional Application") is made under 35 U.S.C. §119(e). The entire disclosures of the '865 Provisional Application, the '365 Application and the '160 Provisional Application are hereby incorporated herein.

TECHNICAL FIELD

This disclosure relates to techniques for disposing of toxic materials, such as various byproducts of coal burning processes, including fly ash and toxic materials. More specifically, this disclosure relates to techniques and apparatuses for improving safety in handling and processing toxic materials for recycling and disposal, including incorporation of toxic materials into feldspar materials in amounts that match or are less than comparable materials naturally present at a selected disposal site.

BACKGROUND

The disclosed processes resolve issues that relate to the disposal of fly ash, other byproducts of coal power generation and other toxic and/or hazardous materials. In various embodiments, fly ash or other waste is incorporated into an artificial feldspar material, which is also referred to herein as "artificial feldspar." The artificial feldspar is then disposed of or used for a variety of different purposes. Examples of other uses for the artificial feldspar include, but are not limited to, use as an aggregate (e.g., in concrete, in asphalt, etc.), as road base, as gravel, as another fill material or the like.

As illustrated by the pie chart of FIG. 1, in 2009, forty-four and nine tenths percent (44.9%) of all electricity generated in the United States came from coal burning power plants. Twenty-three and four tenths percent (23.4%) of electricity in the U.S. during that same year was generated by natural gas fired power plants. Nuclear power plants generated twenty and three tenths percent (20.3%) of electricity in the U.S. in 2009. Other sources of electricity in the U.S. in 2009 and their contributions to the overall U.S. power demand during that year are also shown in FIG. 1.

In recent years in the U.S., coal has been burned at a rate of 1.05 billion tons annually to generate electricity. In addition to generating electricity, a number of byproducts, or waste materials, are formed as coal is burned. These include fly ash, or furnace ash, of which about 72 million tons are generated each year in the U.S., cinder and sludge, as well as carbon dioxide, of which about 1.9 billion tons is produced in the U.S. each year, air pollutants and oxides of silicon, aluminum, iron, calcium, magnesium, titanium, sodium, potassium, arsenic, mercury, sulfur, uranium and thorium.

In addition, coal burning often releases radioactive materials, such as uranium-235, uranium-238 and thorium, and isotopes formed by the decay of radioactive materials, which are also known as "daughters." These daughters may include materials such as radium, radon, polonium, bismuth, lead and potassium-40, all of which are hazardous materials. Any uranium-238 released as coal is burned may react with neutrons in the air (e.g., from oxygen bombardment, nitrogen nuclei generated by cosmic rays, etc.) to form plutonium-239. Other materials that are present in the waste that is generated by burning coal include mercury (at a current rate of about 109 tons per year), arsenic (at a current rate of about 7,884 tons per year), beryllium (at a current rate of about 1,167 tons per year), cadmium (at a current rate of about 750 tons per year), chromium (at a current rate of about 8,810 tons per year), nickel (at a current rate of about 9,339 tons per year), selenium (at a current rate of about 2,587 tons per year), uranium (at a current rate of about 801 tons per year; of which about 11,400 pounds are uranium-235) and thorium (at a current rate of about 1,971 tons per year). Altogether, toxic materials currently account for an estimated 120 million tons of the waste generated each year by coal burning power plants in the U.S. With about five hundred coal burning power plants currently in the U.S., this averages out to about 240,000 tons of toxic waste per power plant.

Before burning, coal is crushed and washed. The waste from these processes includes mercury, arsenic, beryllium, cadmium, nickel, selenium and acid mine runoff.

When the coal is burned, fly ash and sludge are formed. These byproducts also include mercury, arsenic, beryllium, cadmium, nickel and selenium, along with chromium, titanium, uranium and thorium, as well as toxic gases and a variety of radioactive materials. Although the gaseous waste that is generated when coal is burned is scrubbed to remove toxic components and prevent their release into the atmosphere, scrubbing processes also form toxic materials. As an example, scrubbing of coal with sulfur dioxide creates calcium sulfite ($CaSO_3$) and calcium sulfate ($CaSO_4$), both of which are toxic materials. The National Council on Radiation Protection and Measurements (NCRP) has determined that one ton of coal has a radiation of 0.00427 millicuries. At current rates, coal burning in the U.S. releases 4,483,500 millicuries of radiation into the environment each year. Based on current projections, by the year 2040, 11.716 billion tons of coal will be burned each year, resulting in an annual release of 145,230 tons of uranium (of which 5,883 tons will be uranium-235) and 1,039,709 tons of thorium into the environment.

At current energy production rates, it has been estimated that about seventy-two million (72,000,000) tons of fly ash is produced by coal burning power plants in the U.S. each year. Fly ash is typically stored in pits and landfills. The U.S. currently includes three hundred fifty (350) sites that have been approved and designated for permanent disposal of coal waste, including fly ash. Since all coal wastes are deposited in chemically active state, they release toxins over time. As rainwater filters through fly ash, toxic metals are leached from the fly ash into the water, which flows into the ground and ultimately contaminates groundwater and the biosphere. According to U.S. Environmental Protection Agency (EPA), a ten (10) acre fly ash landfill may introduce about 0.2 gallon to about ten (10) gallons of toxic metals into groundwater each day.

As demonstrated by the following table, each of the forty-nine continental states of the U.S. has at least one site that has been approved and designated for disposal of coal waste:

| State | Rank (Waste) | Tons of Waste | Rank (Toxic Metals) | Tons of Toxic Metals | Tons of Waste in Ponds | Tons of Waste in Landfills |
|---|---|---|---|---|---|---|
| Texas | 1 | 13,454,000 | 1 | 8,915 | 576,810 | 6,490,800 |
| Pennsylvania | 2 | 11,057,650 | 4 | 5,639 | 1,076,700 | 2,536,500 |
| Kentucky | 3 | 8,599,400 | 6 | 4,853 | 2,298,000 | 3,409,900 |
| Indiana | 4 | 8,528,650 | 3 | 5,958 | 2,273,450 | 2,820,400 |
| Ohio | 5 | 7,836,700 | 2 | 6,594 | 2,667,300 | 899,900 |
| West Virginia | 6 | 6,190,900 | 5 | 4,990 | 896,200 | 3,118,400 |
| Florida | 7 | 5,180,787 | 12 | 3,029 | 74,000 | 1,335,300 |
| Illinois | 8 | 4,411,100 | 9 | 3,264 | 747,800 | 8,000 |
| North Carolina | 9 | 4,008,200 | 10 | 3,243 | 1,344,200 | 607,200 |
| New Mexico | 10 | 3,799,300 | 30 | 870 | 517,100 | 89,300 |
| Georgia | 11 | 3,508,910 | 7 | 4,192 | 1,541,900 | 825,610 |
| Tennessee | 12 | 3,505,220 | 16 | 2,176 | 632,100 | 732,600 |
| Alabama | 13 | 3,200,700 | 11 | 3,175 | 1,810,400 | 903,500 |
| North Dakota | 14 | 3,001,100 | 8 | 3,419 | 334,800 | 1,736,400 |
| New York | 15 | 2,838,410 | 29 | 1,000 | — | 699,990 |
| Arizona | 16 | 2,775,030 | 19 | 1,795 | 387,900 | 1,148,730 |
| Utah | 17 | 2,366,700 | 17 | 2,027 | 131,000 | 1,475,200 |
| Missouri | 18 | 2,332,150 | 14 | 2,469 | 779,150 | 221,700 |
| Virginia | 19 | 2,329,200 | 18 | 1,877 | 448,200 | 943,000 |
| Michigan | 20 | 2,129,700 | 13 | 2,524 | 669,200 | 769,500 |
| Wyoming | 21 | 2,106,300 | 23 | 1,306 | 448,100 | 950,400 |
| South Carolina | 22 | 2,091,490 | 15 | 2,315 | 301,050 | 377,100 |
| Maryland | 23 | 1,932,740 | 20 | 1,594 | 28,100 | 420,300 |
| Louisiana | 24 | 1,629,300 | 31 | 838 | 191,300 | 691,100 |
| Colorado | 25 | 1,607,970 | 21 | 1,442 | 5,700 | 655,080 |
| Minnesota | 26 | 1,544,110 | 28 | 1,022 | 813,910 | 420,400 |
| Wisconsin | 27 | 1,480,900 | 22 | 1,406 | 11,000 | 267,700 |
| Oklahoma | 28 | 1,462,300 | 27 | 1,180 | 16,560 | 123,900 |
| Washington | 29 | 1,405,220 | 39 | 279 | — | 424,220 |
| Kansas | 30 | 1,386,400 | 25 | 1,253 | 194,300 | 539,200 |
| Mississippi | 31 | 1,308,100 | 26 | 1,196 | 99,100 | 707,000 |
| Iowa | 32 | 1,228,100 | 24 | 1,284 | 201,700 | 151,600 |
| Montana | 33 | 1,018,900 | 37 | 364 | 963,600 | — |
| Maine | 34 | 892,110 | 46 | 20 | — | 858,700 |
| Arkansas | 35 | 784,567 | 32 | 784 | 59,700 | 284,640 |
| Nevada | 36 | 771,600 | 36 | 391 | — | 477,200 |
| New Jersey | 37 | 642,300 | 35 | 488 | — | — |
| Nebraska | 38 | 595,000 | 33 | 630 | — | 166,500 |
| Massachusetts | 39 | 384,890 | 34 | 581 | — | — |
| Delaware | 40 | 284,100 | 38 | 316 | — | 149,000 |
| New Hampshire | 41 | 177,650 | 40 | 210 | — | 2,600 |
| Connecticut | 42 | 172,730 | 41 | 160 | — | — |
| Oregon | 43 | 99,900 | 42 | 114 | — | 17,500 |
| South Dakota | 44 | 97,300 | 43 | 82 | 000,000 | 0,080,100 |
| Hawaii | 45 | 51,500 | 44 | 46 | — | — |
| California | 46 | 50,400 | 45 | 38 | — | — |
| Idaho | 47 | 26,800 | — | — | 0 | 0 |

The implementation of so-called coal gasification—converting coal into gas before combustion—reduces the volume of produced waste, but still poses very serious contamination issues and environmental risks. The table that follows provides a projection of the amounts of coal waste that result from coal gasification processes:

| State | Number of New Plants | Projected Tons of Coal Waste | Rank |
|---|---|---|---|
| Texas | 7 | 3,653,412 | 1 |
| South Dakota | 2 | 952,630 | 2 |
| Nevada | 3 | 888,272 | 3 |
| Montana | 3 | 848,278 | 4 |
| Florida | 2 | 736,649 | 5 |
| South Carolina | 2 | 731,110 | 6 |
| Michigan | 5 | 686,879 | 7 |
| Illinois | 3 | 632,521 | 8 |
| Missouri | 4 | 515,709 | 9 |
| Wisconsin | 3 | 512,632 | 10 |
| Georgia | 2 | 507,952 | 11 |
| Wyoming | 4 | 449,022 | 12 |
| Pennsylvania | 5 | 430,275 | 13 |
| Kentucky | 3 | 410,548 | 14 |

-continued

| State | Number of New Plants | Projected Tons of Coal Waste | Rank |
|---|---|---|---|
| New Mexico | 1 | 366,937 | 15 |
| Ohio | 1 | 325,864 | 16 |
| Arkansas | 2 | 316,691 | 17 |
| Oklahoma | 2 | 316,691 | 17 |
| Iowa | 2 | 312,755 | 19 |
| Utah | 3 | 296,257 | 20 |
| Louisiana | 2 | 294,414 | 21 |
| North Carolina | 1 | 251,099 | 22 |
| West Virginia | 2 | 247,775 | 23 |
| Nebraska | 2 | 199,063 | 24 |
| Virginia | 1 | 173,472 | 25 |
| Colorado | 1 | 169,656 | 26 |
| North Dakota | 1 | 93,797 | 27 |
| Arizona | 1 | 90,483 | 28 |

In January 2009, Sue Sturgis of the Institute of Southern Studies compiled a list of the top one hundred (100) U.S. coal burning power plants, in terms of coal waste stored in surface impoundments:

| Rank | Facility | Corporate Owner | City | State | 2006 Surface Impoundment Releases (lbs.) |
|---|---|---|---|---|---|
| 1 | Stanton Energy Center | Orlando Utilities Commission | Orlando | FL | 8,423,056 |
| 2 | Sherburne County Generating Plant | Xcel Energy | Becker | MN | 4,721,862 |
| 3 | Coal Creek Station | Great River Energy | Underwood | ND | 4,372,709 |
| 4 | Scherer Steam Electric Plant | Georgia Power/ Southern Company | Juliette | GA | 4,114,502 |
| 5 | Detroit Edison Monroe Power Plant | DTE Energy | Monroe | MI | 4,110,859 |
| 6 | Gibson Generating Station | Duke Energy | Owensville | IN | 3,030,524 |
| 7 | Gorgas Steam Plant | Alabama Power/ Southern Company | Parrish | AL | 2,888,290 |
| 8 | Cholla Power Plant | Arizona Public Service Company | Joseph City | AZ | 2,863,427 |
| 9 | Wansley Steam Plant | Georgia Power/ Southern Company | Roopville | GA | 2,673,672 |
| 10 | Ghent Generating Station | E.ON US | Ghent | KY | 2,664,501 |
| 11 | J.M. Stuart Station | Dayton Power & Light, Duke, AEP | Manchester | OH | 2,456,637 |
| 12 | Harllee Branch Generating Plant | Georgia Power/ Southern Company | Milledgeville | GA | 2,433,945 |
| 13 | Barry Steam Plant | Alabama Power/ Southern Company | Bucks | AL | 2,350,349 |
| 14 | Gaston Steam Plant | Alabama Power/ Southern Company | Wilsonville | AL | 2,306,006 |
| 15 | Miller Steam Plant | Alabama Power/ Southern Company | Quinton | AL | 2,160,349 |
| 16 | La Cygne Generating Station | Great Plains Energy | Lacygne | KS | 2,127,000 |
| 17 | Gallatin Fossil Plant | Tennessee Valley Authority | Gallatin | TN | 2,093,068 |
| 18 | Boswell Energy Center | Minnesota Power | Cohasset | MN | 2,009,628 |
| 19 | Leland Olds Station | Basin Electric Power Cooperative | Stanton | ND | 1,937,821 |
| 20 | Widows Creek Fossil Plant | Tennessee Valley Authority | Stevenson | AL | 1,864,177 |
| 21 | Paradise Fossil Plant | Tennessee Valley Authority | Drakesboro | KY | 1,765,148 |
| 22 | Labadie Power Station | AmerenUE | Labadie | MO | 1,740,882 |
| 23 | Kingston Fossil Plant | Tennessee Valley Authority | Harriman | TN | 1,738,437 |
| 24 | Cardinal Plant | American Electric Power | Brilliant | OH | 1,707,225 |
| 25 | Bowen Steam Plant | Georgia Power/ Southern Company | Cartersville | GA | 1,684,118 |
| 26 | Pearl Station | Soyland Power Cooperative | Pearl | IL | 1,661,744 |
| 27 | New Madrid Power Plant | Associated Electric Cooperative | Marston | MO | 1,514,440 |
| 28 | Kammer and Mitchell Plants | American Electric Power | Moundsville | WV | 1,372,687 |
| 29 | Kyger Creek Station | Ohio Valley Electric Corp. | Cheshire | OH | 1,356,475 |
| 30 | Greene County Steam Plant | Alabama Power/ Southern Company | Forkland | AL | 1,343,973 |
| 31 | Baldwin Energy Station | Dynegy | Baldwin | IL | 1,324,467 |
| 32 | Rush Island Power Station | AmerenUE | Festus | MO | 1,307,769 |
| 33 | Karn and Weadock Generating Plants | Consumers Energy | Essexville | MI | 1,171,382 |
| 34 | Cayuga Generating Station | Duke Energy | Cayuga | IL | 1,154,623 |
| 35 | Council Bluffs Energy Center | MidAmerican Energy | Council Bluffs | IA | 1,092,320 |
| 36 | Chesterfield Power Station | Dominion | Chester | VA | 1,088,260 |
| 37 | Milton R. Young Station | Minnkota Power Cooperative | Center | ND | 1,036,290 |
| 38 | Wabash River Generating Station | Duke Energy | W. Terre Haute | IN | 951,610 |
| 39 | A. B. Brown Generating Station | Vectren | Mount Vernon | IL | 944,944 |

-continued

| Rank | Facility | Corporate Owner | City | State | 2006 Surface Impoundment Releases (lbs.) |
|---|---|---|---|---|---|
| 40 | Big Sandy Plant | American Electric Power | Louisa | KY | 915,079 |
| 41 | Amos Plant | American Electric Power | Winfield | WV | 864,024 |
| 42 | Big Cajun II | NRG Energy | New Roads | LA | 860,640 |
| 43 | Hammond Steam Generating Station | Georgia Power/ Southern Company | Rome | GA | 849,068 |
| 44 | Tanners Creek Plant | American Electric Power | Lawrenceburg | IN | 819,840 |
| 45 | Muskingum River Plant | American Electric Power | Beverly | OH | 791,757 |
| 46 | Mayo Generating Plant | Progress Energy | Roxboro | NC | 786,128 |
| 47 | Killen Generating Station | Dayton Power & Light, Duke Energy | Manchester | OH | 715,435 |
| 48 | Roxboro Steam Plant | Progress Energy | Semora | NC | 698,290 |
| 49 | Trimble County Generating Station | E.ON US | Bedford | KY | 637,434 |
| 50 | E.W. Brown Generating Station | E.ON US | Harrodsburg | KY | 637,230 |
| 51 | George Neal Station North | MidAmerican Energy | Sergeant Bluff | IA | 612,005 |
| 52 | Clifty Creek Station | Ohio Valley Electric Corp. | Madison | IN | 590,808 |
| 53 | Welsh Power Plant | American Electric Power | Pittsburg | TX | 562,064 |
| 54 | Coleto Creek Power Station | International Power | Fannin | TX | 550,623 |
| 55 | L. V. Sutton Electric Plant | Progress Energy | Wilmington | NC | 548,210 |
| 56 | Laramie River Station | Basin Electric Power Cooperative | Wheatland | WY | 541,970 |
| 57 | Lansing Smith Generating Plant | Gulf Power/ Southern Company | Southport | FL | 520,282 |
| 58 | Naughton Power Plant | PacifiCorp/ MidAmerican Energy | Kemmerer | WY | 517,966 |
| 59 | Meramec Power Plant | AmerenUE | Saint Louis | MO | 481,318 |
| 60 | Shawnee Fossil Plant | Tennessee Valley Authority | West Paducah | KY | 467,616 |
| 61 | Brayton Point Station | Dominion | Somerset | MA | 464,254 |
| 62 | Duck Creek Station | Ameren | Canton | IL | 462,272 |
| 63 | Twin Oaks Power Station | OptimEnergy | Bremond | TX | 449,002 |
| 64 | Conesville Power Plant | American Electric Power | Conesville | OH | 447,846 |
| 65 | G.G. Allen Steam Plant | Duke Energy | Belmont | NC | 439,208 |
| 66 | Montrose Station | Great Plains Energy | Clinton | MO | 422,100 |
| 67 | Allen Fossil Plant | Tennessee Valley Authority | Memphis | TN | 416,705 |
| 68 | Cliffside Plant | Duke Energy | Mooresboro | NC | 413,459 |
| 69 | Asheville Plant | Progress Energy | Arden | NC | 411,793 |
| 70 | Meredosia Power Station | Ameren | Meredosia | IL | 398,106 |
| 71 | Louisa Generating Station | MidAmerican Energy | Muscatine | IA | 382,063 |
| 72 | Asbury Generating Station | Empire District Electric Co. | Asbury | MO | 381,186 |
| 73 | H. W. Pirkey Power Plant | American Electric Power | Hallsville | TX | 380,111 |
| 74 | Yates Steam Generating Plant | Georgia Pacific/ Southern Company | Newnan | GA | 376,610 |
| 75 | Joppa Steam Plant | Ameren | Joppa | IL | 366,675 |
| 76 | Havana Power Station | Ameren | Havana | IL | 360,772 |
| 77 | Apache Generating Station | Arizona Electric Power Cooperative | Cochise | AZ | 360,465 |
| 78 | Canadys Station | SCE&G/SCANA | Canadys | SC | 357,897 |
| 79 | Lee Steam Plant | Progress Energy | Goldsboro | NC | 356,078 |
| 80 | Kincaid Generating Plant | Dominion | Kincaid | IL | 355,108 |
| 81 | Cape Fear Steam Plant | Progress Energy | Moncure | NC | 334,076 |
| 82 | Intermountain Power Station | Intermountain Power Service Corp. | Delta | UT | 333,589 |
| 83 | Frank Ratts Generating Station | Hoosier Energy | Petersburg | IN | 330,014 |

-continued

| Rank | Facility | Corporate Owner | City | State | 2006 Surface Impoundment Releases (lbs.) |
|---|---|---|---|---|---|
| 84 | McDonough/Atkinson Steam Plant | Georgia Power/Southern Company | Smyrna | GA | 318,051 |
| 85 | Petersburg Generating Station | AES | Petersburg | IN | 309,961 |
| 86 | Dolet Hills Power Station | Cleco | Mansfield | LA | 291,208 |
| 87 | Rockport Plant | American Electric Power | Rockport | IN | 281,995 |
| 88 | Buck Steam Station | Duke Energy | Spencer | NC | 279,190 |
| 89 | Hugo Plant | Western Farmers Electric Cooperative | Hugo | OK | 275,203 |
| 90 | Wood River Station | Dynegy | Alton | IL | 267,066 |
| 91 | Gallagher Generating Station | Duke Electric | New Albany | IN | 260,183 |
| 92 | Oklaunion Power Station | American Electric Power | Vernon | TX | 254,652 |
| 93 | Gadsden Steam Plant | Alabama Power/Southern Company | Gadsden | AL | 249,740 |
| 94 | Iatan Generating Station | Great Plains Energy | Weston | MO | 240,245 |
| 95 | Sioux Power Plant | AmerenUE | West Alton | MO | 226,193 |
| 96 | Flint Creek Power Plant | American Electric Power | Gentry | AR | 221,456 |
| 97 | Riverton Power Plant | Empire District Electric Company | Riverton | KS | 212,688 |
| 98 | Spurlock Power Station | East Kentucky Power Cooperative | Maysville | KY | 196,954 |
| 99 | Jeffrey Energy Center | Westar Energy | Saint Marys | KS | 190,417 |
| 100 | W.S. Lee Steam Station | Duke Energy | Pelzer | SC | 190,030 |
| | | | | Total | 114,790,602 |

The EPA has found that, since 2004, ninety percent (90%) of coal burning power plants in the U.S. violate the Clean Water Act. Many violations are accidental, but they all pose significant health risks and risks to the environment, particularly since combustion reduces the volume of coal by eighty-five percent (85%), which results in a significant increase in the concentration of all of the byproducts of coal burning processes. Some of the hazards of coal waste were apparent after Oct. 11, 2000, when an estimated three hundred six million (306,000,000) gallons of coal mining sludge burst through the bottom of a Massey Energy coal slurry impoundment in Martin County, Ky., filling Wolf Creek and Coldwater Fork, two tributaries of the Tug River. That disaster killed all aquatic life in the affected tributaries, leaving sludge over five feet thick along parts of their banks and adjacent land and poisoning the water supply for about 27,000 people. The Martin County coal fly ash slurry spill was thirty (30) times as big as the Exxon Valdez oil spill. Other fly ash spills, including the Tennessee Valley Authority (TVA) Kingston Fossil Plant coal fly ash slurry spill on Dec. 22, 2008, have had similarly disastrous effects on the environment.

There are a number of additional sites where similar disasters could happen. The EPA has released a list of "high hazard" dumps for coal waste (including fly ash), which includes the forty-four (44) sites listed below:

| Owner | Site | Facility | Location |
|---|---|---|---|
| E.ON-owned Kentucky Utilities Company | Ghent Generating Station | Ash Pond Basin 1 | Ghent, KY |
| E.ON-owned Kentucky Utilities Company | Ghent Generating Station | Ash Pond Basin 2 | Ghent, KY |
| E.ON-owned Louisville Gas & Electric Co | Cane Run Station | Ash Pond | Louisville, KY |
| PPL Montana LLC | Colstrip Steam Plant | Units 1 & 2 Stage Evaporation Ponds (STEP) | Colstrip, MT |
| Progress Energy Carolinas Inc | Asheville Plant | 1982 Pond | Arden, NC |
| Progress Energy Carolinas Inc | Asheville Plant | 1964 Pond | Arden, NC |
| Allegheny Energy | Pleasants Power Station | McElroy's Run Embankment | Willow Island, WV |
| American Electric Power | Big Sandy Plant | Fly Ash | Louisa, KY |
| American Electric Power | Cardinal Plant | Fly Ash Reservoir 2 | Brilliant, OH |
| American Electric Power | Gavin Plant | Fly Ash Pond | Cheshire, OH |

-continued

| Owner | Site | Facility | Location |
|---|---|---|---|
| American Electric Power | Gavin Plant | Bottom Ash Pond | Cheshire, OH |
| American Electric Power | Amos Plant | Fly Ash Pond | St. Albans, WV |
| American Electric Power | Mitchell Plant | Fly Ash Pond | Moundsville, WV |
| American Electric Power | Muskingum River Plant | Unit 5 Bottom Ash Pond (Lower Fly Ash Pond) | Waterford, OH |
| American Electric Power | Muskingum River Plant | Upper Fly Ash Pond | Waterford, OH |
| American Electric Power | Muskingum River Plant | Middle Fly Ash Pond | Waterford, OH |
| American Electric Power | Philip Sporn Power Plant | Fly Ash Pond | New Haven, WV |
| American Electric Power | Tanners Creek Plant | Fly Ash Pond | Lawrenceburg, IN |
| Arizona Electric Power Cooperative | Apache Generating Station | Ash Pond 4 | Cochise, AZ |
| Arizona Electric Power Cooperative | Apache Generating Station | Ash Pond 1 | Cochise, AZ |
| Arizona Electric Power Cooperative | Apache Generating Station | Ash Pond 3 | Cochise, AZ |
| Arizona Electric Power Cooperative | Apache Generating Station | Scrubber Pond 2 | Cochise, AZ |
| Arizona Electric Power Cooperative | Apache Generating Station | Scrubber Pond 1 | Cochise, AZ |
| Arizona Electric Power Cooperative | Apache Generating Station | Evaporation 1 | Cochise, AZ |
| Arizona Electric Power Cooperative | Apache Generating Station | Ash Pond 2 | Cochise, AZ |
| Arizona Public Service Company | Cholla Generating Station | Bottom Ash Pond | Joseph City, AZ |
| Arizona Public Service Company | Cholla Generating Station | Fly Ash Pond | Joseph City, AZ |
| Duke Energy | G.G. Allen Steam | Plant Active Ash Pond | Belmont, NC |
| Duke Energy | Belews Creek Steam Station | Active Ash Pond | Walnut Cove, NC |
| Duke Energy | Buck Steam Station | New Primary Pond | Spencer, NC |
| Duke Energy | Buck Steam Station | Secondary Pond | Spencer, NC |
| Duke Energy | Buck Steam Station | Primary Pond | Spencer, NC |
| Duke Energy | Dan River Steam Station | Secondary Pond | Eden, NC |
| Duke Energy | Dan River Steam Station | Primary Pond | Eden, NC |
| Duke Energy | Marshall Steam Station | Active Ash Pond | Terrell, NC |
| Duke Energy | Riverbend Steam Station | Secondary Pond | Mount Holly, NC |
| Duke Energy | Riverbend Steam Station | Primary Pond | Mount Holly, NC |
| Dynegy Midwest Generation | Havana Power Station | East Ash Pond | Havana, IL |
| Dynegy Midwest Generation | Wood River Station | East Ash Pond (2 cells) | Alton, IL |
| FirstEnergy | Bruce Mansfield Power Station | Little Blue Run Dam | Shippingport, PA |
| Southern Company-owned Georgia Power | Branch Generating Plant | E | Milledgeville, GA |
| E.ON-owned Kentucky Utilities Company | E.W. Brown Generating Station | Auxiliary Pond | Harrodsburg, KY |
| E.ON-owned Kentucky Utilities Company | E.W. Brown Generating Station | Ash Pond | Harrodsburg, KY |
| E.ON-owned Kentucky Utilities Company | Ghent Generating Station | Gypsum Stacking Facility | Ghent, KY |

In the U.S., coal waste dumps contain billions of gallons of fly ash and other toxic coal waste. All of these sites are threats to water supplies, human health and the environment.

SUMMARY

This disclosure includes methods for processing toxic waste, including the byproducts of coal burning processes, or "coal waste" or "coal combustion residuals" ("CCRs"), which includes fly ash, sludge and a variety of toxic materials. A method for processing toxic materials, such as coal waste, includes forming artificial feldspar that includes one or more toxic materials (e.g., fly ash, etc.). The artificial feldspar is tailored for use as an aggregate in concrete and other cementitious materials, as road base and/or for compatibility with a host site.

In a specific embodiment, fly ash and, optionally, other coal waste and/or additives are mixed with an aqueous material (e.g., water; sludge, or liquid waste, produced by coal crushing, cleaning and/or burning processes; etc.) and retained, or allowed to set. As the mixture sets, alumina silicate clusters form. Once alumina silicate clusters have formed, the mixture is introduced into a continuous flow/batch reactor ("CFR") of a known type. In some embodiments, the CFR may heat the mixture to a temperature of up to 1,400° F., or an even higher temperature. The temperature of the CFR and the duration of time for which the mixture is subjected to processing by the CFR may correspond to an intended compound and product (e.g., aggregate, road base, fill material, etc.) in terms of particle size, shape, density and other characteristics. The product traps any toxic materials present in the fly ash in a manner and concentration similar to those in which the toxic materials were originally present in coal, which may result in a product that is only about as toxic as the coal from which it was derived and, in some embodiments, may be less toxic than the coal from which it was derived. Thus, the safety of the product will not be as questionable as the safety of fly ash, and the product can be safely used in a variety of different ways, introduced into virtually any environment or disposed of in a safe and effective manner.

Environmentally safe compounds and products that result from such processes are also disclosed. An environmentally safe compound includes artificial feldspar formed from coal waste, including fly ash. Individual pieces or particles of the compound may have a configuration suitable for introduction into a predetermined disposal site, for example, they may match the configurations and other characteristics of pieces or particles of materials that are already present at the disposal site, including, without limitation, naturally occurring materials at the disposal site. Various embodiments of such configurations include aggregates for use with binders (e.g., cementitious binders, asphalt, etc.), as road base or as a fill material (e.g., gravel, sand, dirt, etc.).

In some embodiments, an environmentally safe compound may be incorporated into a material (e.g., a construction material, etc.) that may be used to form a structure. Non-limiting examples of such materials include cementitious materials (e.g., concrete, mortar, etc.) and asphalts. Thus, the predetermined disposal site may be a structure formed from a material that includes the environmentally safe compound. Alternatively, an environmentally safe compound that has been formed from coal waste, including fly ash, may be disposed of as a road base, as a fill material or in any other suitable manner.

Other aspects, as well as features and advantages of various aspects, of the disclosed subject matter will become apparent to those of ordinary skill in the art through consideration of the ensuing description, the accompanying drawings and the appended claims.

DETAILED DESCRIPTION

Figure 1:
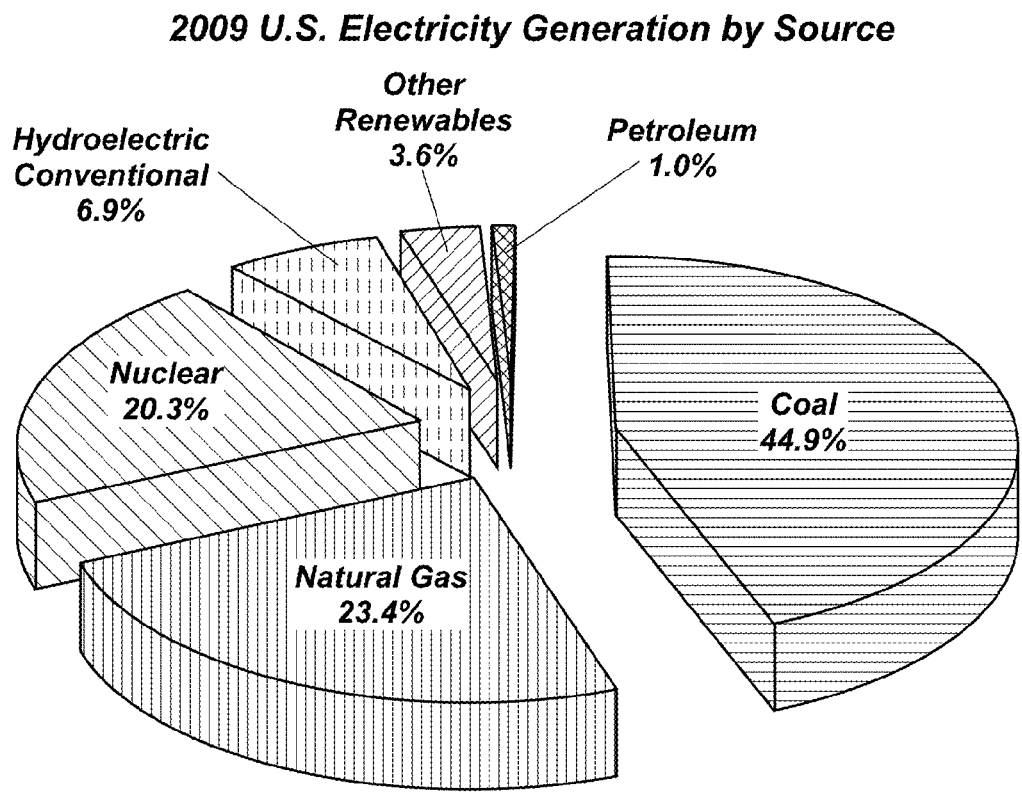
FIG. 1 is a pie chart showing different categories of sources of electricity available in the United States of America in 2009 and the percentage of total electricity provided by each category of sources.

In various embodiments, methods for converting toxic materials, such as coal waste (e.g., fly ash, sludge, etc.) include forming artificial feldspar from the toxic materials or incorporating the toxic materials into artificial feldspar.

Such a process includes forming a mixture, or slurry, that includes toxic material(s). In embodiments where the toxic material(s) comprise(s) coal waste, the mixture may include fly ash and an aqueous component (e.g., water, sludge, other liquid waste, etc.). Some mixtures may include one or more additives that will impart the resulting artificial feldspar with one or more desired characteristics. As a non-limiting example, in embodiments where the artificial feldspar comprises an aggregate, anorthite (e.g., in the form of crushed dolomite, etc.) may be added to the mixture in an amount sufficient to impart the artificial aggregate with a desired amount of durability (e.g., about eight percent (8%), by weight of the mixture, to about twelve percent (12%), by weight of the mixture, etc.). After forming the mixture, it is retained, or allowed to set. As the mixture sets, alumina silicate clusters form. The alumina silicate clusters contain the toxic materials.

After alumina silicate clusters have formed, the mixture is introduced into a CFR of a known type. The CFR may be part of a fixed facility or it may comprise a mobile unit. As another alternative, naturally occurring fumaroles may be used as a CFR to convert the toxic material(s) to (an) environmentally safe product(s).

The temperature to which the mixture is exposed in the CFR, and the amount of time that the mixture is exposed to the elevated temperature of the CFR are tailored to provide artificial feldspar with desired characteristics. In some embodiments, a CFR may heat the mixture to a temperature of up to 1,400° F.

In embodiments where the toxic material comprises coal waste, subjecting the mixture to CFR processing will heat mercury in the coal waste, and cause the mercury to evaporate. The evaporated mercury may be collected. In vapor form, the mercury can be collected by passing the entire gas stream released from the CFR through a series of centrifuges, which separate the mercury vapors on the basis of density. Alternatively, the mercury may be condensed, then collected and used (or sold) for a variety of purposes.

The artificial feldspar that results from such a process has at least two predetermined properties. The CFR process provides each artificially made feldspar molecule with an initial content of (4) molecules of water, leaving four (4) additional sites available for water molecules to occupy of the eight (8) total available sites on each feldspar molecule. Thus, the artificial feldspar will be unable to transport solutes until eight (8) water molecules have associated themselves with the feldspar molecule—an event that takes at least 10,000 years to occur in natural sites that are not normally exposed to liquid groundwater. In addition, the CFR process forms a silicon coating on the artificial feldspar, encasing any toxic materials present in the artificial feldspar.

Figure 2:
FIG. 2 is an image of artificial feldspar made in accordance with teachings of this disclosure.

The CFR is configured to provide an environmentally safe product with a desired physical configuration (e.g., particle size, shape, etc.). When a CFR is used to form artificial feldspar, it is possible to form the artificial feldspar into any of a variety of configurations, including small particles, pellets, larger pieces and molded block. The artificial feldspar may be configured in a manner suitable for its intended use. A few examples include dry masonry, artificial aggregates, road base and fill materials. FIG. 2 provides an image of a specific embodiment of artificial feldspar, or an environmentally safe product, that may be formed by such a process.

Processes for forming artificial feldspar may be performed without the production of any byproducts that require additional purification (i.e., unsafe byproducts, etc.).

Artificial aggregates may be configured for use in a variety of materials, including, without limitation, concrete and other cementitous materials, asphalt and other construction materials. An artificial aggregate may be tailored to have a desired hardness and/or durability. As an example, an artificial aggregate that includes dolomite or another source of anorthite may have a rating of nine (9) out of ten (10) on the Los Angeles Scale of Strength and Durability. Some embodiments of artificial aggregate may have a higher strength and durability than aggregate obtained from naturally occurring sources.

Construction materials that include artificial aggregate are useful for forming a variety of structures, including, but not limited to, pavement. Artificial aggregates may have a configuration (e.g., shape, dimensions, etc.) that matches or substantially matches the configuration of natural aggregates.

As a fill material, the artificial feldspar may comprise common engineering fill (e.g., 85% to 87% of MDD at OMC, reference ASTM or AASHTO, etc.). While fill materials that have been formed from artificial feldspar can be placed virtually anywhere, a few suitable locations include underground mines (e.g., mines that are subject to remediation and closure, etc.), open pit mines, berms, dikes and trenches. In some embodiments, artificial feldspar that is in the form of a fill material may be put into place in the same manner as ordinary engineering fill, then protected from surface water via a high plastic clay cap (common in civil engineering) having a thickness of about two feet to about three feet and covered with crushed rejects from any asphalt, concrete or stone production quarry/facility (e.g., for protection against flash floods, etc.).

In embodiments where the toxic material comprises coal waste, the toxic waste may be converted to an environmentally safe product at or near the coal burning power plant. In other embodiments, the process of converting toxic waste into an environmentally safe product is performed at or near a site where the environmentally safe product is to be used or otherwise disposed of. Conversion of toxic waste to an environmentally safe product at such a location will minimize issues related to handling and transportation.

In addition to reducing the detrimental impact of coal waste on the environment by providing a safe use for coal waste and other toxic materials, the production of artificial feldspar will have an added positive impact on the environment by reducing the need for exploration for aggregates, road base and fill materials. In addition, the use of coal waste to product artificial feldspar may reduce or eliminate the costs associated with identifying new sources for aggregates, road base and fill materials.

Additional information that may be useful in conjunction with the various aspects of the disclosed subject matter is set forth in International patent application no. PCT/US13/24232, filed on Jan. 31, 2013 and titled "NANO FLEX HLW/SPENT FUEL RODS RECYCLING AND PERMANENT DISPOSAL," the entire disclosure of which is, by this reference, incorporated herein.

The disclosed embodiments should not be deemed to limit the scope of any of the claims that follow. The scope of each claim should be limited merely by its plain language, and should be deemed to include the full complement of available equivalents.

What is claimed is:

1. A method for processing coal waste, comprising:
mixing coal waste, including fly ash, with water to form a slurry;
allowing the slurry to set until alumina silicate clusters form;
introducing the slurry into a continuous flow reactor to form an environmentally stable product including $Ca(Al,Si)O_2$.

2. The method of claim 1, wherein introducing the slurry into the continuous flow reactor comprises forming an aggregate.

3. The method of claim 2, further comprising:
introducing the aggregate into a cementitous binder.

4. The method of claim 3, wherein introducing the aggregate into the cementitious binder comprises introducing the aggregate into a cementitious binder that includes further aggregate.

5. The method of claim 2, further comprising:
mixing the aggregate with asphalt.

6. The method of claim 1, wherein introducing the slurry into the continuous flow reactor comprises forming road base.

7. The method of claim 1, wherein introducing the slurry into the continuous flow reactor comprises forming a fill material.

8. An environmentally safe compound for permanent storage of coal waste, comprising:
artificial feldspar having a chemical formula of $Ca(Al,Si)O_2$ formed from coal waste, including fly ash, and having a configuration configured for introduction into a predetermined disposal site.

9. The environmentally safe compound of claim 8, wherein the artificial feldspar has a configuration configured for use as an aggregate in a cementitious material or in asphalt.

10. The environmentally safe compound of claim 9, wherein the artificial feldspar includes anorthite.

11. The environmentally safe compound of claim 8, wherein the artificial feldspar has a configuration configured for use as a fill material.

12. The environmentally safe compound of claim 8, wherein the artificial feldspar has a configuration suitable for use as a road base.

13. A cementitious material, comprising:
a cementitious binder; and
aggregate dispersed throughout the cementitious binder, the aggregate including artificial feldspar having a chemical formula of $Ca(Al,Si)O_2$ formed from coal waste, the coal waste including fly ash.

14. The cementitious material of claim 13, comprising concrete.

15. A pavement material, comprising:
a binder; and
aggregate dispersed throughout the binder, the aggregate including artificial feldspar having a chemical formula of $Ca(Al,Si)O_2$, the artificial feldspar formed from coal waste, including fly ash.

16. The pavement material of claim 15, wherein the binder comprises a cementitious binder.

17. The pavement material of claim 16, wherein the binder comprises asphalt.

* * * * *